United States Patent
Itkin et al.

(10) Patent No.: US 10,445,279 B1
(45) Date of Patent: Oct. 15, 2019

(54) AUTOMATIC PCIE OPERATING MODE CONFIGURATION

(71) Applicant: Mellanox Technologies, Ltd., Yokneam (IL)

(72) Inventors: Yuval Itkin, Zoran (IL); Assad Khamaisee, Kfar Kana (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 16/039,386

(22) Filed: Jul. 19, 2018

(51) Int. Cl.
*G06F 13/40* (2006.01)
*G06F 9/445* (2018.01)
*G06F 13/42* (2006.01)

(52) U.S. Cl.
CPC ...... *G06F 13/4063* (2013.01); *G06F 9/44505* (2013.01); *G06F 13/4282* (2013.01); *G06F 2213/0026* (2013.01)

(58) Field of Classification Search
CPC .............. G06F 9/4405; G06F 13/4004; G06F 13/0418; G06F 13/4022; G06F 13/4027; G06F 13/4063; G06F 13/42; G06F 13/4221; G06F 13/4265; G06F 13/4282; G06F 2213/0026
See application file for complete search history.

(56) References Cited

U.S. PATENT DOCUMENTS

| | | | |
|---|---|---|---|
| 6,553,439 B1 | 4/2003 | Greger et al. | |
| 7,752,376 B1 | 7/2010 | Johnsen et al. | |
| 7,836,238 B2 | 11/2010 | Freimuth et al. | |
| 7,934,032 B1* | 4/2011 | Sardella | G06F 13/4022 710/104 |
| 8,443,126 B2 | 5/2013 | Elboim | |
| 8,832,499 B2 | 9/2014 | Saghi et al. | |
| 9,842,075 B1 | 12/2017 | Davis et al. | |
| 9,910,690 B2 | 3/2018 | Williamson | |
| 10,114,658 B2 | 10/2018 | Huang et al. | |
| 2002/0133662 A1* | 9/2002 | Cheung | G06F 13/385 710/310 |
| 2011/0320652 A1 | 12/2011 | Craddock et al. | |
| 2012/0260015 A1* | 10/2012 | Gay | G06F 13/409 710/301 |
| 2014/0201401 A1* | 7/2014 | Tokumitsu | G06F 13/36 710/104 |
| 2015/0324312 A1* | 11/2015 | Jacobson | G06F 13/4022 710/104 |
| 2016/0170918 A1* | 6/2016 | Butcher | H04L 41/0654 710/307 |
| 2017/0068630 A1* | 3/2017 | Iskandar | G06F 13/4022 |

(Continued)

OTHER PUBLICATIONS

INTEL® Xeon® Processor C5500/C3500 Series Datasheet—vol. 1, 520 pages, Feb. 2010.

(Continued)

*Primary Examiner* — Thomas J Cleary
(74) *Attorney, Agent, or Firm* — Kligler & Associates

(57) ABSTRACT

A computer system includes a system bus having multiple lanes, one or more peripheral devices, and a bus controller. The peripheral devices are coupled to the system bus. The bus controller is configured to receive, from one or more of the peripheral devices, respective indications of numbers of the lanes requested by the peripheral devices, and to configure the system bus in response to the indications.

8 Claims, 3 Drawing Sheets

(56) References Cited

U.S. PATENT DOCUMENTS

2017/0371382 A1* 12/2017 Searby .................. G06F 1/185

OTHER PUBLICATIONS

INTEL.,"Hot-Plug Capability of NVMe SSDs in Server Platforms", White paper, Hot Plug Guidance, 2 pages, 2016.
"PCI Express® Base Specification," Revision 4.0, version 1.0, 1293 pages, Sep. 27, 2017.
U.S. Appl. No. 16/224,833 office action dated May 30, 2019.

* cited by examiner

AUTOMATIC PCIE OPERATING MODE CONFIGURATION

FIELD OF THE INVENTION

The present invention relates generally to configuration of a system bus, and particularly to methods and systems for automatic configuration of the operating mode of a PCI Express (PCIe) bus.

BACKGROUND OF THE INVENTION

PCI Express (PCIe) is a motherboard-level computer bus, which was created in 2004 by Intel, Dell, HP and IBM. PCIe was designed to replace older bus standards, for example PCI, PCI-X and AGB. PCIe specifications are described, for example, in "PCI Express® Base Specification," Revision 4.0, version 1.0, Oct. 5, 2017, issued by PCI SIG, which is incorporated herein by reference.

The PCIe bus is highly scalable and fully serial, supporting from one to thirty-two lanes, wherein each lane comprises two pairs of differential wires, one pair for each signal direction. PCIe specifications include features like Power Management, Quality of Service (QoS), Hot-Plug/Hot-Swap support, Data Integrity, Error Handling and Bifurcation.

Some buses, PCIe being one example, support bifurcation. Bifurcation is a feature, wherein the bus can be split into several smaller-width buses. Thus, for example, a 16-lane PCIe implementation can be split into two 8-lane buses, four 4-lane buses, eight 2-lane buses or 16 one-lane buses. Bifurcation is described, for example, in section 2.6.2.2. of Intel® Xeon® Processor C5500/C3500 Series Datasheet—Volume 1, February 2010.

SUMMARY OF THE INVENTION

An embodiment of the present invention that is described herein provides a computer system including a system bus having multiple lanes, one or more peripheral devices coupled to the system bus, and a bus controller. The bus controller is configured to receive, from one or more of the peripheral devices, respective indications of numbers of the lanes requested by the peripheral devices, and to configure the system bus in response to the indications.

In an embodiment, the computer system further includes peripheral-monitoring logic circuits, which are coupled to the peripheral devices and are configured to send monitor bits that include the indications of the numbers of the lanes requested by the peripheral devices, and a main logic circuit, which is coupled to the bus controller and to the peripheral-monitoring logic circuits and is configured to receive the monitor bits from the peripheral-monitoring logic circuits and to provide the indications to the bus controller. In another embodiment, the peripheral-monitoring logic circuits and the main logic circuit are configured to communicate over a serial bus. In an embodiment, the system bus includes a Peripheral Component Interconnect Express (PCIe) bus.

There is additionally provided, in accordance with an embodiment of the present invention, a method for automatic configuration of a system bus having multiple lanes, including, in a computer system in which one or more peripheral devices are coupled to the system bus, sending to a bus controller, from one or more of the peripheral devices, respective indications of numbers of the lanes requested by the peripheral devices, and configuring the system bus, by the bus controller, in response to the indications.

The present invention will be more fully understood from the following detailed description of the embodiments thereof, taken together with the drawings in which:

DETAILED DESCRIPTION OF EMBODIMENTS

Overview

Figure 1:
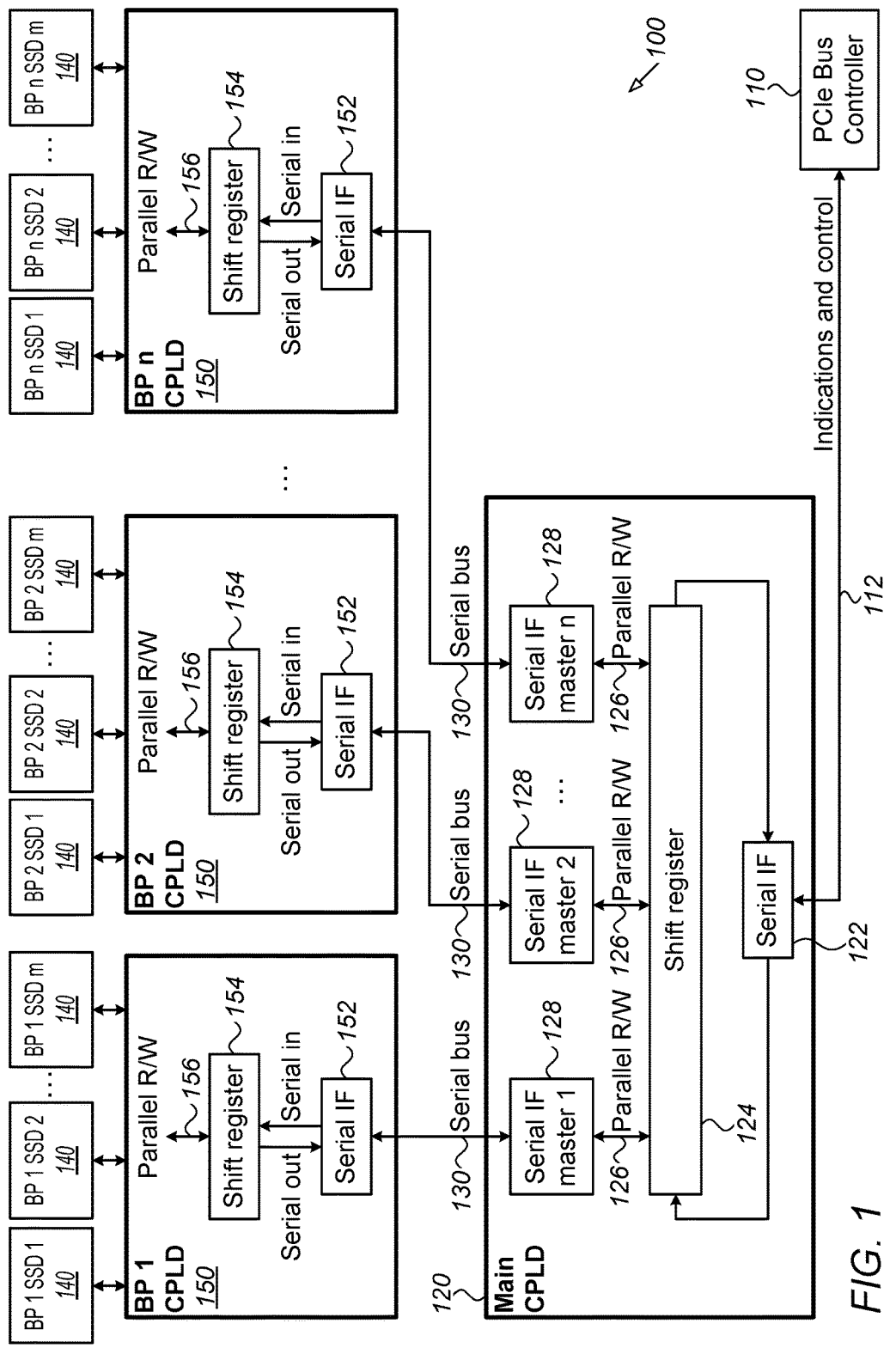
FIG. 1 is a block diagram that schematically illustrates a motherboard of a computer system, and peripheral backplanes, which are connected to the motherboard, in accordance with an embodiment of the present invention.

Embodiments of the present invention that are described herein provide improved methods and devices for automatically configuring a system bus, e.g., a PCIe bus. A computer system according to the disclosed embodiments typically comprises a Processor Board, and one or more peripherals, for example SSD drives.

In an example computer system, the various peripherals are plugged into backplanes, which are connected to sockets in a Mother-Board. The processor board communicates with the peripherals through a system bus, for example PCIe. The PCIe bus may support one or more bifurcation configurations; for example, the PCIe bus can be configured to sixteen lanes if a first peripheral is plugged in one of the backplanes, and to two 8-lane buses if a second peripheral is plugged therein.

Different bifurcation configurations require different setting of a PCIe controller, which is typically embedded in the processor board. According to embodiments of the present invention, the bifurcation configuration is requested by the peripherals and indicated to the PCIe bus controller, which will then configure the bus bifurcation in accordance with the indications from the peripherals. Thus, for example, when a peripheral is replaced, it is not necessary to manually change some or all the configuration settings of the motherboard, the PCIe controller and/or the operating system—at least part of the configuration is done automatically by the PCIe controller.

According to embodiments of the present invention, A Bifurcation Configuration Assertion Control Logic is coupled to some or all the peripherals. The Bifurcation Configuration Assertion Control Logic asserts the bifurcation configuration of the peripherals on a Bifurcation Configuration Bus in the motherboard. The Bifurcation Configuration Bus is typically separate from the PCIe bus. A Motherboard Controller Logic continuously monitors the Bifurcation Configuration Bus and signals the bifurcation configuration to the PCIe bus controller. The PCIe bus controller then configures the PCIe bus according to the bifurcation configuration requested by the peripherals via the Bifurcation Configuration Bus.

According to an embodiment, the Bifurcation Configuration bus is serial; according to some embodiments the Bifurcation Configuration Assertion Control Logic is embedded in Complex Programmable Logic Devices (CPLD) in the motherboard and coupled to peripheral backplanes that are plugged in the motherboard. According to an embodiment, the Motherboard Controller Logic is embedded in a main CPLD device, coupled to the Bifurcation Configuration Bus and to the PCIe bus controller.

According to some embodiments, the serial bus comprises a clock, a data-in bit, a data-out bit and a capture bit, wherein data is transferred through a shift register comprising a multitude of flip-flops connected in series. Data bits propagate through the series of flip-flops whenever the clock toggles, and the capture input indicates that the propagation is completed. The bifurcation configuration is updated at the CPLD coupled to the processor.

System Description

FIG. 1 is a block diagram that schematically illustrates a mother-board 100 of a computer system, and peripheral backplanes, which may be connected to the mother-board 100 e.g., directly by installing the backplane into the motherboard's PCIe slot, or via an adaptor card and cables that connect the PCIe slot signals from the mother-board to the backplane, in accordance with an embodiment of the present invention. A PCIe Bus Controller 110 communicates through a system bus (not shown), for example, PCIe, with one or more peripherals of the computer system. The peripherals are plugged into backplanes (not shown) which are connected to (e.g. plugged into) the motherboard. According to the example of FIG. 1, the peripherals may be Solid State Disks (SSD) 140. Alternatively, any other suitable peripherals can be used.

Control information is communicated from the PCIe bus controller 110, through an Indications and Control Bus 112 to a Main Logic Circuit 120, which may be a CPLD (referred to as Main CPLD hereinafter), and which may be mounted on the computer system mother-board.

Main CPLD 120 comprises a serial interface unit 122, configured to shift input data from Indications and Control bus 112 into a shift register 124, and serial data out of the shift register onto the Indications and Control bus. Shift register 124 is configured to have serial in, serial-out, parallel-in and parallel-out ports and controls, wherein data originating in bus controller 110 may propagate through Indications and Control bus 112, serial interface 122 and shift register 124 back to serial interface 122, and from there through Indications and Control bus 112 to bus controller 110; and, wherein, parallel ports 126 are configured to write and read parallel data into/from the shift register.

Main CPLD 120 also comprises serial interface master units 128, configured to a) receive serial data from serial buses 130 and load the data through parallel ports 126 into shift register 124; and b) read parallel data from shift register 124 through parallel ports 126, and send the data serially over serial bus 130.

In some embodiments, Computer System Motherboard 100 may comprise one or more sockets, wherein various computer peripherals may be mounted in some or in all the socket. In the example embodiment, SSDs 140 are plugged into backplanes (not shown), which plug into the motherboard. A respective Peripheral Monitoring Logic Circuit, 150, which may be a CPLD device, may be coupled to some or all the backplanes, to enable bus bifurcation. CPLDs 150 are referred to herein as "backplane bifurcation CPLDs." Each backplane bifurcation CPLD comprises a serial interface unit 152, and a shift register 154, as well as other control and monitoring functions (not shown). Serial Interface unit 152 is configured to route input serial data from serial bus 130 into the corresponding shift register 154, and to route serial data from shift register 154 to serial bus 130. Each backplane bifurcation CPLD 150 may be mounted on a respective backplane board.

Similarly to shift register 124, Shift register 154 is configured to have serial in, serial-out, parallel-in and parallel-out ports and controls, wherein data from serial bus 130 may propagate from serial interface 152 to shift register 154, and data from shift register 154 may propagate through serial interface 152 to serial bus 130; and, wherein, parallel ports 156 are configured to write and read parallel data into/from shift register 154.

Parallel data read from shift register 154 through parallel port 156 may comprise configuration information set by bus controller 110 individually for each peripheral 140; whereas parallel data read from parallel ports 156 onto shift registers 154 may comprise bifurcation configuration as well as other status indications sent to bus controller 110 from CPLD 150.

The computer system configuration shown in FIG. 1 is an example configuration that is depicted purely for the sake of conceptual clarity. Any other suitable configurations can be used in alternative embodiments. The different computer system elements may be implemented using suitable hardware, such as in one or more Application-Specific Integrated Circuit (ASIC) or Field-Programmable Gate Arrays (FPGA), using software, or using a combination of hardware and software elements.

Figure 2:
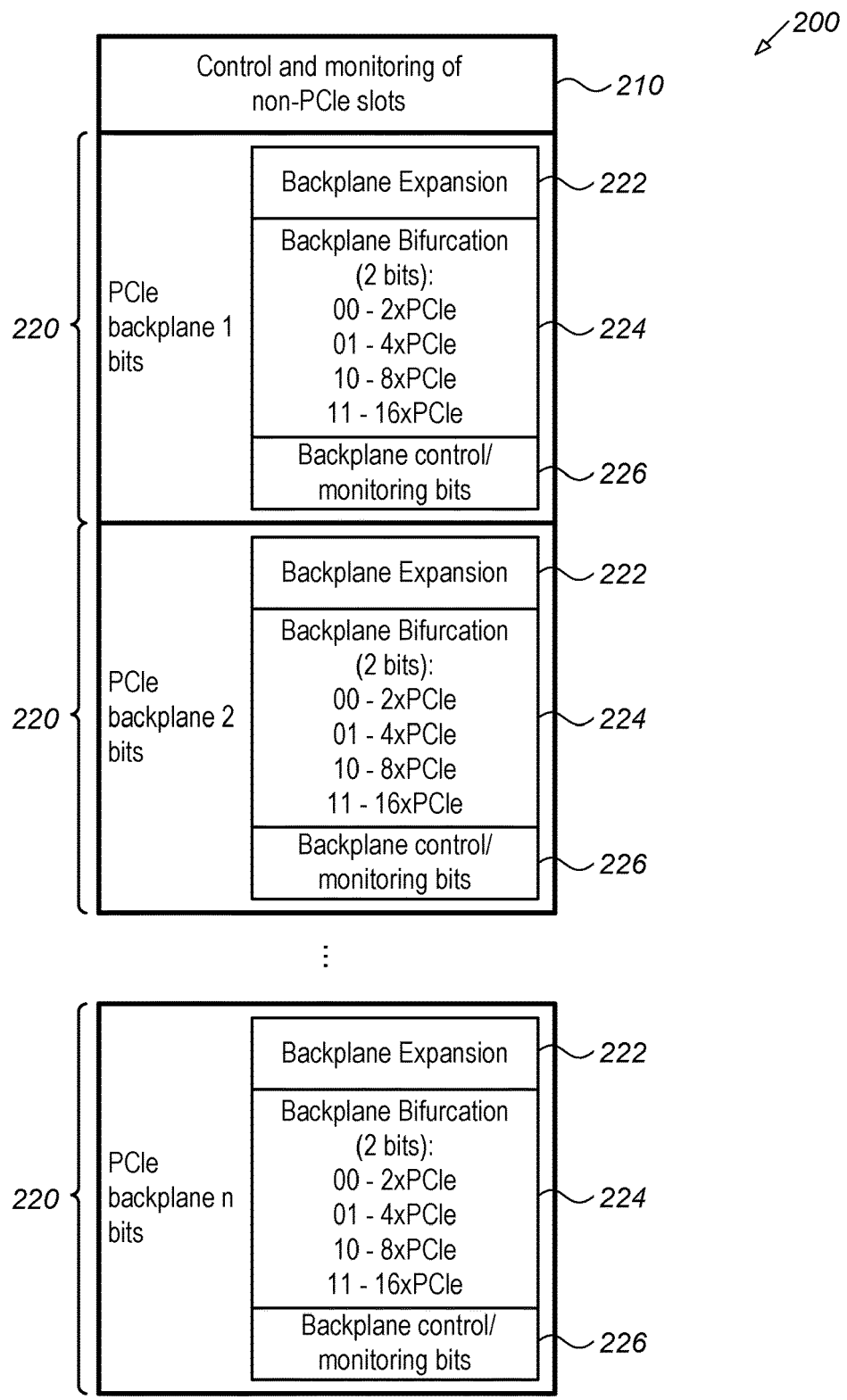
FIG. 2 is a table that schematically illustrates bits of a configuration and monitoring word, in accordance with an embodiment of the present invention.

FIG. 2 is a table that schematically illustrates the structure of a group 200 of serial bits that are transferred from bus controller 110 (FIG. 1) to Backplane bifurcation CPLD devices 150, and from the Backplane bifurcation CPLD devices to the bus controller, according to an embodiment of the present invention. Groups of bits will be referred to hereinafter as Words.

Word 200 comprises control output bits and monitoring input bits. Some or all the control output bits are sent from bus controller 110 to backplane bifurcation CPLD devices 150. The monitoring input bits are configured to monitor the configuration and activity of the peripherals; some or all the monitoring input bits may be sent from backplane bifurcation CPLD devices 150 to bus controller 110.

Word 200 may be divided to a Word 210, comprising control and monitoring bits for non-PCIe peripherals and to non-bifurcated PCIe buses (if any), and several Words 220, comprising bits for the control and monitoring of the PCIe backplanes. According to an embodiment, the number of Words 220 is equal to the number of PCIe backplane bifurcation CPLDs in computer system 100.

According to some embodiments, multiple backplanes could be implemented as a single Printed Circuit Board (PCB).

According to some embodiments, multiple backplane CPLDs could be implemented as a single CPLD device.

According to some embodiments word 220 may comprise a Backplane-Expansion bit 222, two Slot Bifurcation Bits 224, and a Word 226, comprising other control and monitoring bits. Backplane Expansion bit 222 may indicate that a bus is bifurcated and that a matching backplane bifurcation CPLD 150 is connected to Main CPLD 120 to control the bifurcation of the backplane, with bifurcation configuration as defined by the Backplane-Bifurcation Bits.

According to embodiments of the present invention, Word 224 is an encoding of the bifurcation configuration. For example, word 224 may comprise two bits, and encoded as follows:

00—Bifurcation configuration is for 8 independent 2 PCIe lanes buses

01—Bifurcation configuration is for 4 independent 4 PCIe lanes buses

10—Bifurcation configuration is for dual 8 PCIe lanes buses

11—Bifurcation configuration is for a single 16 PCIe lanes bus

In alternative embodiments, other suitable encoding schemes, covering various bifurcation configurations, may be used.

Peripherals 140 may be connected to backplanes 150, which then set the bifurcation configuration of the peripherals. When there is a need to change the bifurcation configuration, the backplane is replaced. Backplane bifurcation CPLD 150 of the installed backplane will reflect the bifurcation change using bits 224 of word 200. Main CPLD 120 will communicate the updated word 200 to PCIe bus controller 110, which will update the bifurcation configuration of the PCIe bus.

Figure 3:
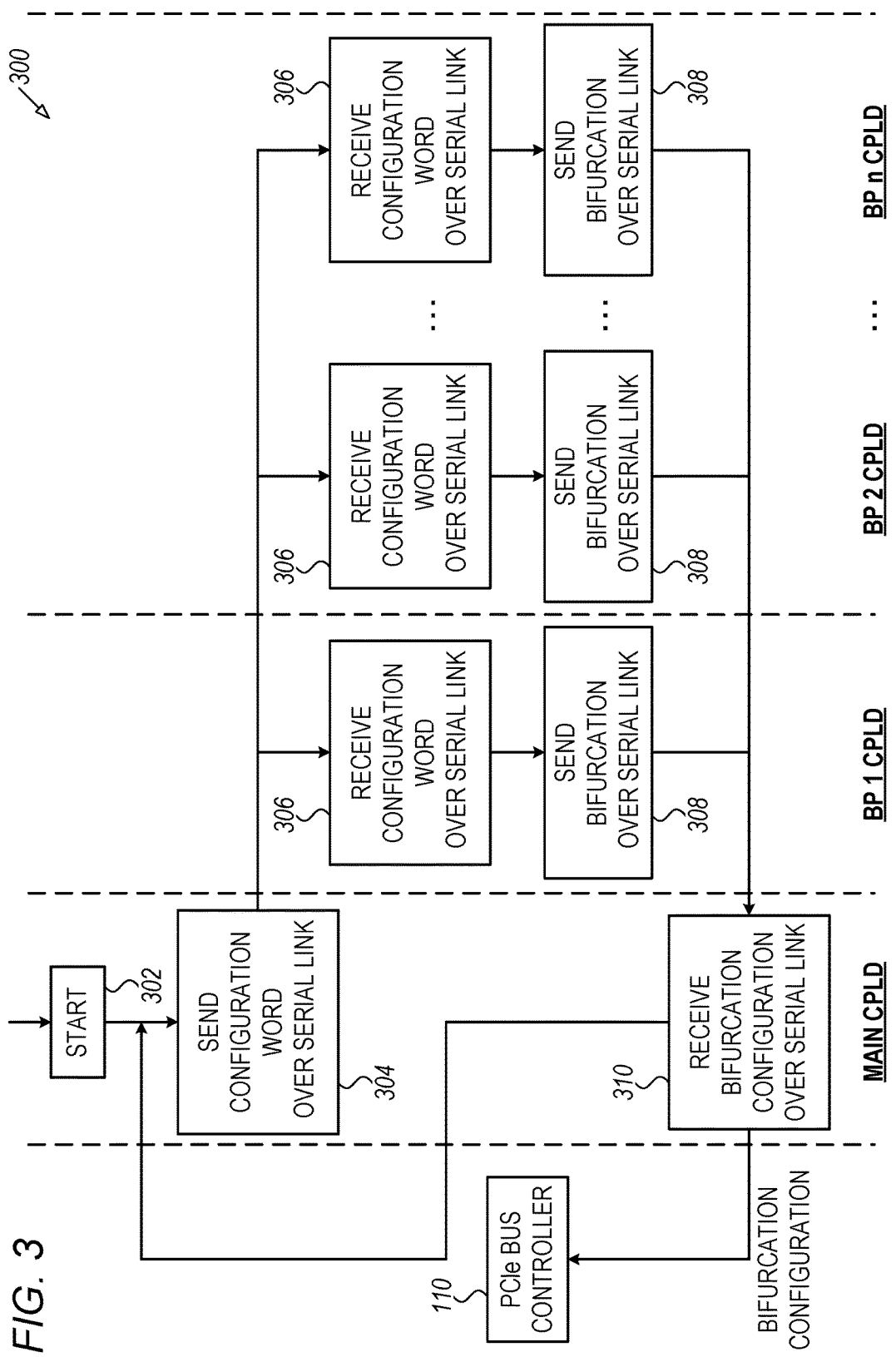
FIG. 3 is a flow chart that schematically illustrates a method for Automatic PCIe Operating Mode Configuration, in accordance with an embodiment of the present invention.

FIG. 3 is a flow chart 300 that schematically illustrates a method for automatic PCIe operating mode configuration, according to embodiments of the present invention. The flow chart describes operations that are executed by main CPLD 120 and by backplane-CPLDs 150 (FIG. 1).

The flow chart starts when main-CPLD 120 enters a Starting Step 302. In an embodiment, main-CPLD 120 enters Starting Step 302 when bus controller 110 is reset.

After Starting Step 302, the main-CPLD 120 enters a Sending Configuration Word Step 304, wherein it sends a configuration word over serial bus 130 to backplane-bifurcation CPLDs 150.

The backplane bifurcation CPLDs enter a Receiving Configuration Word Step 306 when they receive the serial word sent in step 304. In some embodiments, the received configuration word may set the value of one or more configuration bits in backplane-bifurcation CPLD 150.

After (or concurrently with) step 306, the backplane bifurcation CPLDs enter a Sending-Bifurcation-Configuration Step 308, wherein they send a status word, which may comprise the bifurcation configuration of the corresponding peripherals over serial bus 130.

After step 308, Main CPLD 120 enters a Receive-Bifurcation-Configuration Step 310, wherein it receives the status words sent by the various backplane-CPLDs in step 308, which may comprise the bifurcation configuration of the backplane-CPLDs. In some embodiments of the present invention, receiving status words sent by the various backplane-CPLDs (step 310) may start at a time that Main CPLD 120 has received the serial data from backplane-bifurcation CPLDs 150; i.e. before sending the configuration word (step 304) is completed.

The bifurcation configuration received in step 310 is at all time visible to PCIe bus controller 110, which will configure PCIe bus transactions and operation according to the updated bifurcation configuration.

Although, in the method described herein, flow chart 300 is executed by CPLD devices, the flow chart can be executed by any type of suitable programmable logic device, including general and special purpose processors, embedded in other VLSI circuits or self-contained. In some embodiments steps of flowchart 300 may be executed concurrently.

Although the embodiments described herein mainly address Automatic PCIe Operating Mode Configuration, the methods and systems described herein can also be used in other applications, such as in Automatic Operating Mode Configuration of other types of buses that support variable bus widths, including (but not limited to) Ethernet and Infiniband®.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer system, comprising:
a system bus having multiple lanes, and configured to have backplanes plugged therein directly or via an adaptor card;
one or more backplanes, configured to have one or more peripheral devices replaceably plugged therein and to be replaceably plugged into the system bus, the backplanes comprising one or more logic devices configured to store indications of numbers of the lanes assigned to the peripheral devices; and
a bus controller, which is configured to receive the indications of the numbers of the lanes from the logic devices in the backplane, and to configure the system bus as requested by the logic devices in the backplanes in response to the indications.

2. The computer system according to claim 1, wherein the logic devices in the backplanes are coupled to the peripheral devices and are configured to send monitor bits comprising the indications of the numbers of the lanes assigned to the peripheral devices, and comprising a main logic circuit, which is coupled to the bus controller and to the logic devices and is configured to receive the monitor bits from the logic devices and to provide the indications to the bus controller.

3. The computer system according to claim 2, wherein the logic devices and the main logic circuit are configured to communicate over a serial bus.

4. The computer system according to claim 1, wherein the system bus comprises a Peripheral Component Interconnect Express (PCIe) bus.

5. A method for automatic configuration of a system bus having multiple lanes, the method comprising:
in a computer system in which one or more backplanes have one or more peripheral devices replaceably plugged therein, and replaceably plugged into the system bus, wherein the backplanes comprise one or more logic devices configured to store indications of numbers of the lanes assigned to the peripheral devices, sending to a bus controller, from the logic devices in the backplanes, respective indications of the numbers of the lanes assigned to the peripheral devices; and
configuring the system bus, by the bus controller, in response to the indications sent from the logic devices in the backplanes.

6. The method according to claim 5, wherein sending the indications comprises sending monitor bits, which comprise the indications, from the logic devices coupled to the peripheral devices to a main logic circuit coupled to the bus controller.

7. The method according to claim 6, wherein sending the monitor bits comprises communicating between the logic devices and the main logic circuit over a serial bus.

8. The method according to claim 5, wherein the system bus comprises a Peripheral Component Interconnect Express (PCIe) bus.

\* \* \* \* \*